United States Patent [19]

Inoue et al.

[11] Patent Number: 5,832,085
[45] Date of Patent: Nov. 3, 1998

[54] METHOD AND APPARATUS STORING MULTIPLE PROTOCOL, COMPRESSED AUDIO VIDEO DATA

[75] Inventors: Hajime Inoue, Chiba, Japan; Mingning Gu, San Jose, Calif.; Masao Mizutani, Yokohama, Japan; Koji Iijima, Tokyo, Japan; Hiroshi Okada, Yokohama, Japan; Naofumi Yanagihara, Tokyo, Japan

[73] Assignees: Sony Corporation, Japan; Sony Electronics, Inc., N.J.

[21] Appl. No.: 824,250

[22] Filed: Mar. 25, 1997

[51] Int. Cl.⁶ .......................... H04N 7/167; H04N 7/01; H04N 5/91
[52] U.S. Cl. ...................... 380/10; 348/441; 386/131
[58] Field of Search ................................ 380/10; 348/441; 386/131

[56] References Cited

U.S. PATENT DOCUMENTS 5,570,126   10/1996   Blahut et al. ................................ 348/7
5,574,964   11/1996   Hamlin ........................................ 348/6

*Primary Examiner*—Stephen C. Buczinski
*Attorney, Agent, or Firm*—Blakely, Sokoloff, Taylor & Zafman LLP

[57] ABSTRACT

An apparatus and method to record digital audio/video data originating from different sources in different data formats in a single format for recording on a digital cassette. The apparatus utilizes common circuitry to receive, record and playback the audio/video data while keeping the overall architecture simple. The apparatus is able to accommodate advanced formatting features such as trick play, without significant overhead.

17 Claims, 7 Drawing Sheets

METHOD AND APPARATUS STORING MULTIPLE PROTOCOL, COMPRESSED AUDIO VIDEO DATA

BACKGROUND OF THE INVENTION

1. Field of the Invention

The present invention relates to the field of storage of audio and video data. More particularly, the present invention relates to the storage of multiple protocol audio/video data.

2. Art Background

The recording and playback of audio and video data has grown from a relatively simple process to a complex one that contends with such issues as data compression and multiple input/output formats.

As broadcasting information turns to digital representation, digital data compression techniques are used to reduce the amount of data needed to provide all the audio and video for a particular broadcast. Unfortunately, not all formats for providing such audio/video data are standardized into a common format. One well known and widely used compressed audio/video format is the Moving Pictures Experts Group (MPEG) standard. However, there exist differences between different service providers for the video services with respect to the protocols to transmit MPEG compressed audio and video. For example, DIRECTV, a Los Angeles, Calif. based subsidiary of GM Hughes Electronics and United State Satellite Broadcasting, Inc. (a unit of Hubbard Broadcasting), provides the DIRECTV™ service in a proprietary format that differs from another service provider which uses the MPEG standard for the transmission protocol as well as compression.

The differing formats is problematic for recording devices. To configure a home entertainment system to receive and record broadcasts in different formats such as MPEG and DIRECTV, two separate recording devices having two separate formatted digital cassettes, one compatible to receive MPEG transmissions and one compatible to receive DIRECTV transmissions, would have to be employed.

Therefore, it is desirable to provide a single recording and playback mechanism to record multiple digital protocols.

SUMMARY OF THE INVENTION

The method and apparatus of the present invention provides an innovative mechanism to record digital audio/video data originating from different sources in different data formats in a single format for recording on a digital cassette. The apparatus utilizes common circuitry to receive, record and playback the audio/video data while keeping the overall architecture simple. The apparatus is able to accommodate advanced formatting features such as trick play, without significant overhead.

In one embodiment, the device receives audio and video transmissions that originate from two sources such as a television broadcasts and satellite broadcasts. The recording mechanism records the video in accordance with a pre-defined compressed video format, such as the Motion Picture Experts Group (MPEG) standard. The stream of data arrives to the apparatus in packets, each packet containing header information regarding the packet. Once a packet is received, the apparatus decodes a header to determine the format of the packet and therefore a particular subcircuit appropriate to perform the initial decode of the format when the header has information regarding the format. If the header does not contain information regarding the format, the system decodes in multiple formats and examines the decoded results to determine the correct format.

In the present embodiment, if header information determines that the packet contains audio information, the audio is forwarded to the video recorder for recording. If the header information determines that the packet contains video data, the video data is forwarded to appropriate subcircuitry for decoding in accordance with the format identified in the header. Common circuitry is then utilized to address special two speed trick play recording processing to provide such features as fast forward, slow motion, freeze frame, fast reverse and slow reverse. A packetizer circuit generates the necessary header information needed to record a packet of data in the format compatible with the video recorder and combines it with the video data for storage on a video cassette or similar media.

A similar process can be generated for those recorders that connect to an digital video output device that is a different format than the recorder. A decoder extracts the header parameters from the recorded packet and a packetizer circuit uses the information to generate headers compatible with the output format. In addition, the video or audio data is aligned within the packet to be compatible.

BRIEF DESCRIPTION OF THE DRAWINGS

The objects, features and advantages of the present invention will be apparent to one skilled in the art in light of the following detailed description in which.

DETAILED DESCRIPTION

The present invention provides a simple, low cost apparatus and method for the recording and playback of digital video data received sources of different formats. In the following description, for purposes of explanation, numerous details are set forth, in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
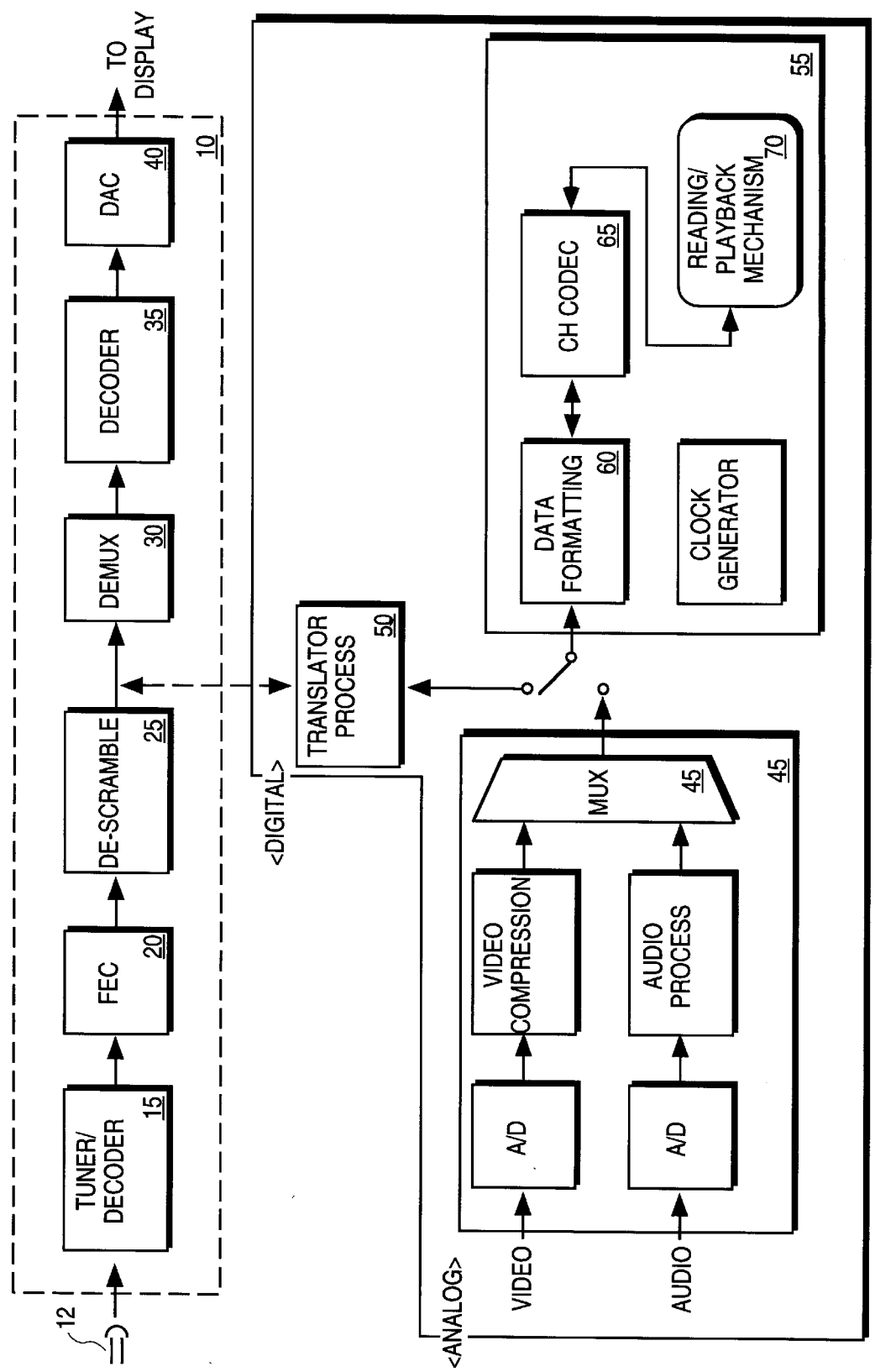
FIG. 1 is a simplified block diagram of a receiver and video recorder that operates in accordance with the teachings of the present invention.

A block diagram of an exemplary receiver and recording apparatus that operates in accordance with the teachings of the present invention is illustrated in FIG. 1. Incoming digital audio and video data arrives in packets. The source media the data is received from can be a variety of digital broadcast media such as satellite transmissions, cable transmissions and television broadcast transmissions. A receiver 10 receives the broadcast from the broadcast source 12.

Typically, a tuner/decoder 15 functions to tune to receive the proper transmission. Error correction on the signal received is performed by block 20. If the transmission is scrambled, the descrambler 25 is employed to provide an unscrambled signal. A demultiplexing circuit 30 receives the unscrambled signal and separates the audio data from video data. The decoder 35 decodes data that is in an encoded format, such as a compressed video format, for output to the digital to analog converter (DAC) 40. The digital to analog converter provides the video and audio data to be shown on the display.

Although standards for digital video data formats have been proposed, not all digital video transmission formats utilized comply with proposed standards. One prominent standard is the Moving Pictures Experts Group (MPEG) standard. MPEG specifies the format for transmitting the compressed moving picture video. However, some existing broadcast media do not comply with the standard. An example of this are broadcast formats of direct broadcast systems (DBS), such as DIRECTV™. A home user that has a DBS system receiver and a DIRECTV receiver, for example, a digital television receiver that complies with the MPEG standard, would need two separate video recorders: one to record in the DBS system format and one to record in the MPEG format.

To avoid the need for two separate recording mechanisms and two separate tapes, the recorder includes circuitry to record in one format in a manner transparent to the user, and using the minimum of extra circuitry. Common circuitry is utilized to the greatest extent possible. In the present embodiment, the digital video data is recorded in compliance with the MPEG standard. Translator processor 50 therefore receives the unscrambled signal from descrambler 25. The descrambled signal is in a format not compatible with the MPEG standard. The translator process extracts the video data and reformats it with the necessary header information to be compatible.

The digital recorder (DC) 55 receives the data and performs internal formatting, block 60, and coding, block 65, prior to recording the video and audio, block 70, on storage media such as a digital videotape.

The present embodiment also provides a conventional audio/video recording mechanism 45 which receives analog audio and video and performs the necessary analog to digital conversions (and compression's) for input to the digital recorder 55.

If video recorded is to be played back to a device such as the display for the DBS system, the video data is read from the storage media, and a reversal process is performed through blocks 55 and 50, to place the data in the proper format for input to the demultiplexer circuitry 30 of the receiver 10.

Figure 2:
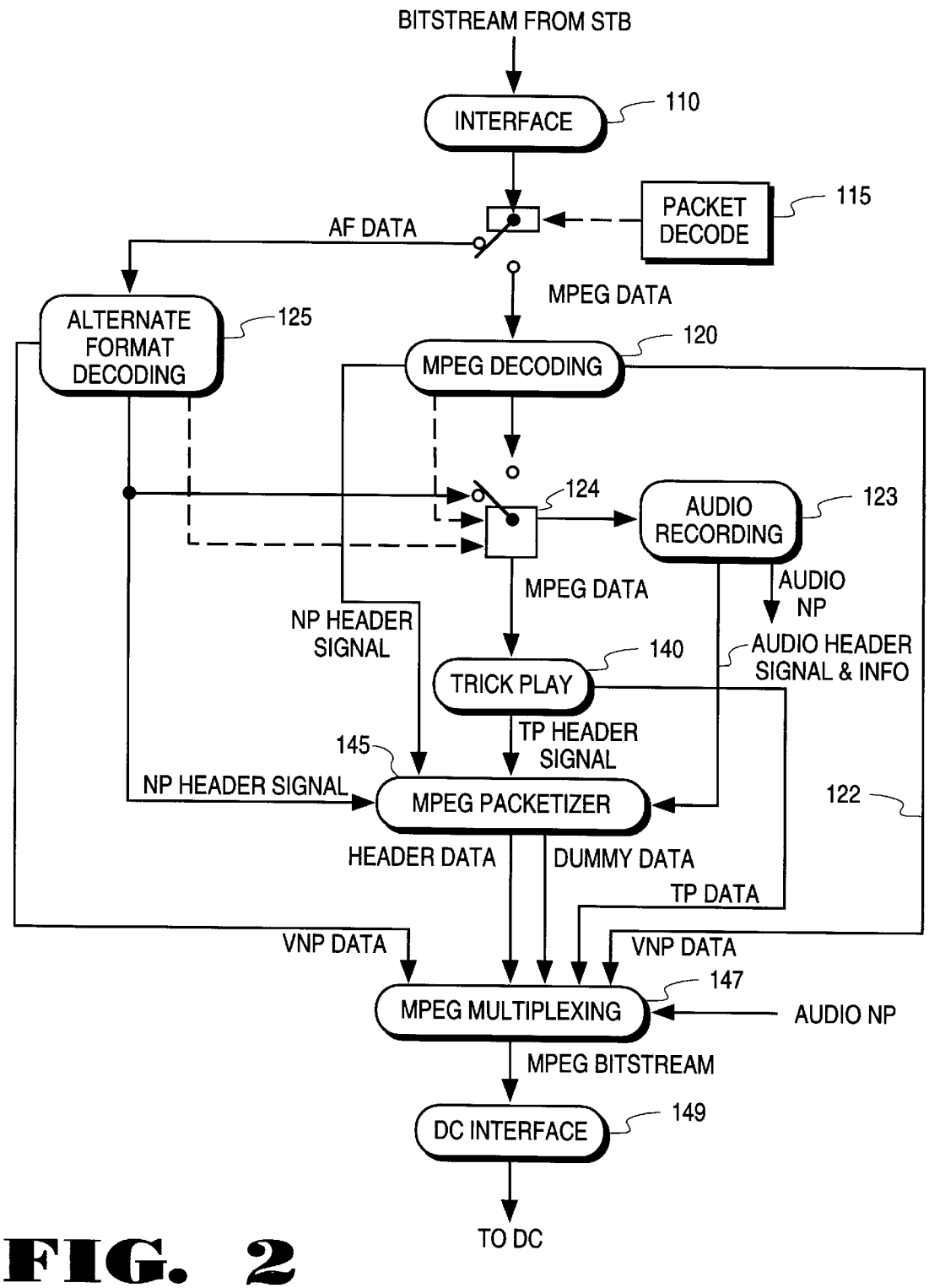
FIG. 2 is a flow chart depicting the recording process.

The recording process flow is described with reference to FIG. 2. The bit stream is received from a broadcast receiver, such as a DBS™ receiver manufactured by Sony Corporation, and processed through an interfacing process 110 to synchronize the bit stream with the circuitry. A packet decode process 115 is used to determine if the data received is in a format compatible with the MPEG standard. If the data is formatted in accordance with the MPEG standard, the data is processed through a MPEG decoder 120 to extract the audio/video data from the packet and forward certain header information to switch 124. If the data is not formatted in accordance with the MPEG standard, the packet is forwarded to a second decoder 125 for extraction of the audio/video data formatted in an alternate format such as DIRECTV™ format provided by GM Hughes Electronics and United States Satellite Broadcasting, Inc.

The extracted data is forwarded to audio/video select circuitry 124 which forwards audio data to circuitry 123 (not shown in detail) for recording on the digital cassette and video data to the trick play circuitry 140. The switch is controlled by a control signal issued by decoder 120 or 125 which determines whether the data is audio or video based upon header information received in the packet. For example, the PID field in a packet that complies with the MPEG standard identifies whether the data is audio or video. Thus, MPEG decoder 120 would issue the necessary control signal to the select circuitry 124.

Trick play circuitry 140 is preferably a variable length decoder which decodes intra frame video data and reduces the amount of data to provide data subsets of the normal play data. More particularly, the number of AC coefficients is reduced to a predetermined level such that the data will fit into the small space on the digital cassette allocated for trick play data. For example, in the same amount of space on the digital cassette, trick play data that provides for 4× fast forward can include more AC coefficients than 17× fast forward data. Preferably, AC coefficients to be included in the trick play data are predefined (e.g., 5 or 6 AC coefficients). Alternately, an adaptive process can be used. In an adaptive process, the size of the picture dictates the number of coefficients used. For example, if the size of the picture is large, the number of AC coefficients used is decreased, and if small, the number of coefficients are increased. Trick play circuitry outputs the trick play video data and trick play header information to MPEG packetizer 145.

The MPEG packetizer 145 generates packets for trick play (TP) and normal play (NP) video data in accordance with the MPEG standard. For NP video in the MPEG format, the header and NP data is simply forwarded to the multiplexer 147 for subsequent recording on a digital cassette.

Figure 3:
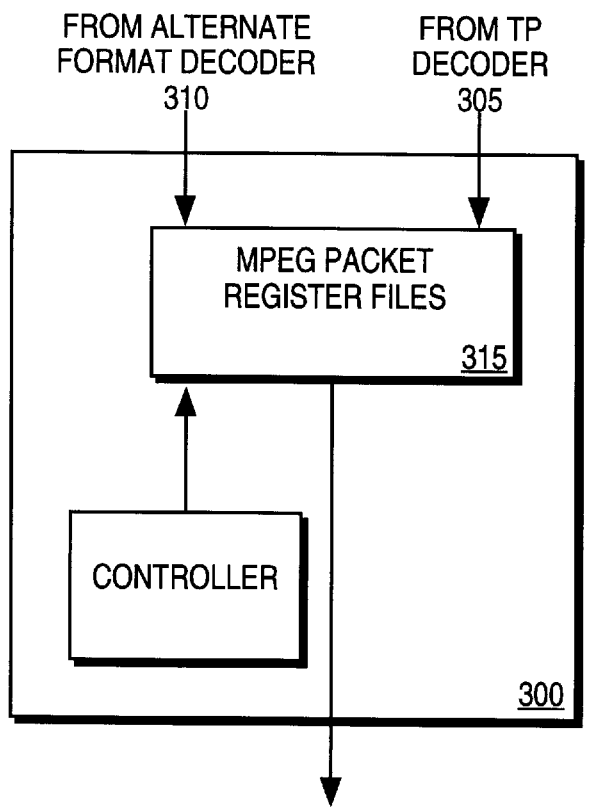
FIG. 3 is a flow chart depicting the playback process.

The header information input to the packetizer contains the necessary MPEG packet header information extracted from the non-MPEG formatted packet. As shown in FIG. 3, the packetizer 300 receives as input the extracted header information 305, 310 and stores the header information in a first portion of packet register files 315. The second portion of packet register files 315 store other pertinent information such as, for example, clock information (PCR), time stamp information (PTS), state flags used for trick play, as well as other status flags, such as those that can be used to control the FIFO on the DRAM bus (e.g., see FIG. 4). The controller 320, which has knowledge of both MPEG and alternate formats, e.g., by storage of format information, and the correspondence between the two formats, reviews the header information received and stored in the first portion of register files 315 and modifies the corresponding portions of the default MPEG header accordingly. Once the default MPEG header is modified, it is output to the multiplexing process 147.

In some embodiments it may be necessary to insert "dummy data" into the header in order to ensure that the packet length is of an acceptable length. For example, if the packet is shorter than the output packet by a predetermined number of bits, dummy data is generated. The controller ensures that dummy data (e.g. 8bit:h00) is mixed with valid data (video NP data, Video TP data and Audio NP data) by the MPEG packetizer. To provide dummy data, the packetizer not only inserts the dummy data but maintains a count of dummy data in order to determine when enough dummy data is inserted for compatibility purposes. In one embodiment, such as the embodiment illustrated in FIG. 4, the count can be maintained by the MPEG packetizer 490 or DRAM controller 420, depending on the implementation. More particularly in one embodiment (FIG. 4) the MPEG packetizer requests writing data from NPFIFO, TPFIFO, HRAMs and the DRAM controller in order to calculate data length and to generate timing data for dummy data generation. The DRAM controller selects the output line to the DRAM to ground while the timing data indicates that dummy data is to be inserted in order to insert the dummy data. The dummy data may be inserted into packets containing audio data and packets containing video data. Preferably for video data packets, the dummy data will be inserted at the very end of the "picture" field (e.g., before the picture start code). For audio data packets, it is preferred that the dummy data be inserted at the very end of the "audio elementary stream".

The multiplexing process 147 receives as input the video normal play data, header data, trick play data (from the MPEG decoding process and alternate format decoding process) audio normal play data, and dummy data, and timely multiplexes the inputs to provide a bitstream compatible with the MPEG format. Preferably, the multiplexing process will read the header output from the packetizing process 145 and appends the corresponding data (e.g., VNP, TP). If the incoming data is video normal play, data are generally encoded in the MPEG format (originating from the MPEG decoding process 120), the header information is forwarded along with the video normal play data as there is no need for the MPEG packetizing process to create or modify the MPEG header. The multiplexed data, which is now a valid MPEG formatted bitstream, is forwarded for recording as the digital media, such as a digital cassette.

Figure 4:
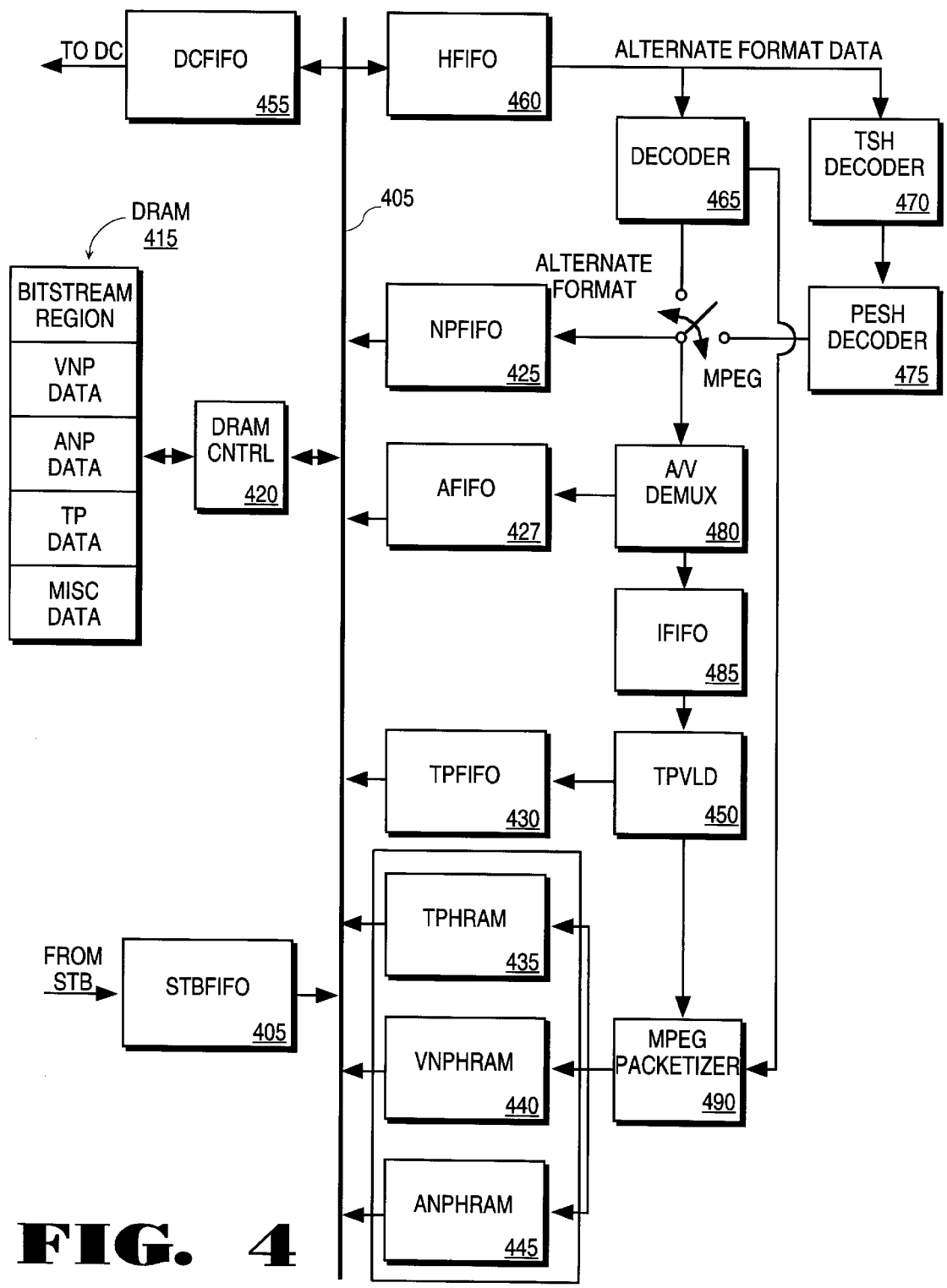
FIG. 4 illustrates one embodiment of circuitry used to record digital video in accordance with the teachings of the present invention.

FIG. 4 is illustrative of an exemplary system structure for recording digital data in accordance with the teachings of the present invention. As will be apparent from subsequent discussions herein regarding the playback of recorded data, many of the elements are also utilized in the playback process such that a cost effective, efficient device is used. Referring to FIG. 4, data is communicated asynchronously along HBUS 405. Data received is input through input buffer (STBFIFO) 405 for storage in DRAM 415. The DRAM 415 functions as storage of incoming data as well as the data generated to form the packet. The DRAM controller 420 controls the storage and retrieval of data in the DRAM 415 and performs the multiplexer functions described above. The DRAM controller can be embodied in circuitry, a state machine, microcontroller or microprocessor. The DRAM controller 420 causes the output of an incoming packet from input buffer 405 to be stored in the DRAM. The DRAM controller further forwards the packet to the buffer HFIFO 460 for processing of the packet for recording.

Preferably the DRAM controller 420 also controls the movement of data between the DRAM and the buffers illustrated, e.g., buffers 405, 455, 460, 425, 427, 430, 435, 440, 445, for subsequent recording on a digital data recording device. Thus, the controller 420 ensures, as header information is generated and the payload is extracted, that the corresponding data is output from the corresponding buffer, e.g., buffers 425, 427, 430, 435, 440, 445 for storage at predetermined memory locations in the DRAM 415. The controller 420 also monitors the status of capacity of the digital cassette FIFO buffer (DCFIFO) 455 and moves bit streams of formatted packet data to the DCFIFO 455 for subsequent output and recording on a digital cassette.

For example, the normal play video data is output to normal play first-in-first-out (FIFO) buffer (NPFIFO) 425. Trick play data is output from the trick play variable length decoder (TPVLD) 450 to trick play FIFO (TPFIFO) 430. The outputs of the MPEG packetizer 455 are input to the trick play header random access memory (TPHRAM) 435, video normal play header random access memory (VNPHRAM) 440 and audio normal play header random access memory (ANPHRAM) 445. The DRAM controller 420 causes the data in the VNPHRAM 440 and NPFIFO 425 to be stored in the VNP data area of the DRAM 415 if the data in the packet received is video data; the data in the ANPHRAM 445 and NPFIFO 425 to be stored in the ANP data area of the DRAM 415 if the data is audio data; and the data in TPHRAM 435 and TPFIFO 430 to be stored in the TP data area of DRAM 415. As capacity in the DCFIFO 455 permits, data is transferred in a sequence compatible with the MPEG format to DCFIFO 455 for subsequent storage on a digital cassette.

As mentioned above, input bit streams received through STBFIFO 405 are transferred for temporary storage in the bit stream region of DRAM 415 and thereafter transferred to HFIFO 460 for decoding and subsequent regeneration of a packet compatible with the recording device. In the present embodiment, incoming packets are decoded by one of two decoders to extract the payload (i.e., audio or video data). TSH decoder 470 decodes the transport packet header of MPEG packets to identify the channel to record as the MPEG format broadcast data provides for multiple channels. The PESH decoder decodes the PES header and checks the copyright information such that only authorized recordings are made. Audio/Video multiplexer 480 and IFIFO 485 respectively demultiplex to extract and buffer video data of the packet for transfer to trick play variable length decoder (TPVLD) 450 and MPEG packetizer 490. If the data is audio data, the audio data is output to audio FIFO 427 (AFIFO). Alternately the NPFIFO and/or TPFIFO can be used to temporarily store the audio data before output.

The data output from the TPVLD 450 is input to the TPFIFO 430 and MPEG packetizer 490. The TPFIFO 430 buffers the trick play data until read by DRAM controller 420 for formation of a packet. The MPEG packetizer 490 uses the TP data to form a trick play header that is stored in TPHRAM 435. Similarly, the alternate format data is output to decoder 465 and input to MPEG packetizer 490 so that the MPEG packetizer can form the MPEG format headers for the audio and video and output the headers to VNPHRAM 440 and ANPHRAM 445.

As noted above, the recording process provides for the recording of MPEG and alternate format data. Using many common circuit elements, the playback process provides for playback of the recorded video in either format in order to be compatible with the format acceptable by the display and other output device.

Figure 5:
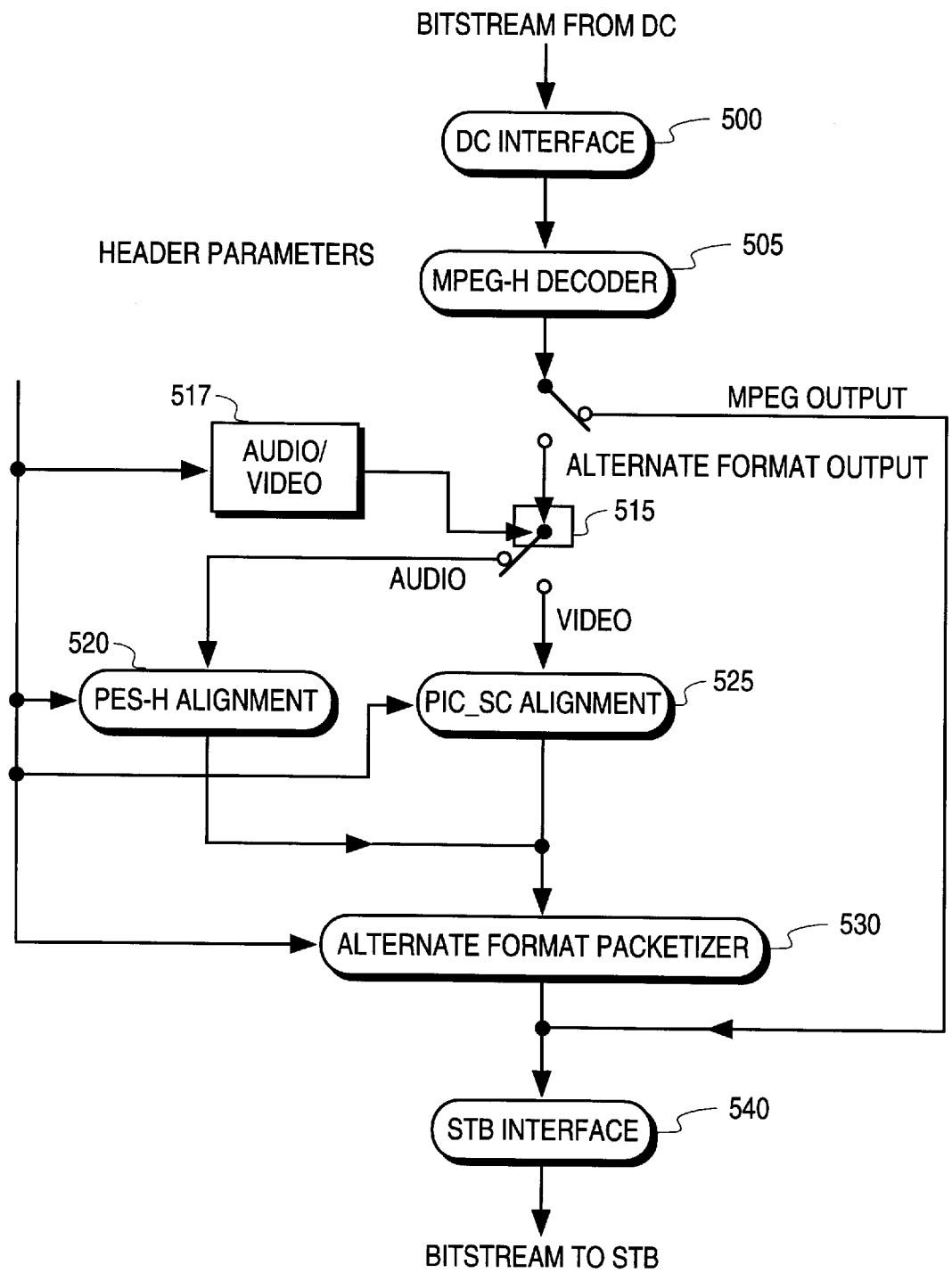
FIG. 5 illustrates one embodiment of circuitry used to playback digital video in accordance with the teachings of the present invention.

The playback process is described with reference to FIG. 5. Packets are read in from the digital cassette playback device through the DC interface 500. The packet is then decoded by the MPEGH decoder 505 to extract the header parameters. If the output device is MPEG compatible, the complete packet is forwarded to the output interface for output to the display. If the device is not MPEG compatible, the payload must be extracted and combined with the appropriate header information compatible with the alternate format. Therefore, the packet output by the MPEG decoder 505 is forwarded to audio/video switch 515 and header parameters are forwarded to audio/video decoder 517 which reads the header parameters to determine if the payload is audio or video and controls switch 515 accordingly. If it is audio, a packetized elementary stream (PES)

header is generated and aligned in accordance with the alternate format by PES-H alignment 520. If the data or payload is video the picture start code (PIC-SC) is generated and aligned by PIC_SC Alignment 530 to ensure that the PES header is in alignment with the start code of the alternate format. If the original packet is one that was previously converted from the alternate format to MPEG, the picture start code detected is used to eliminate dummy data inserted into the beginning of the packet during the prior conversion. The payload, the header information generated for a particular payload, as well as the MPEG headers extracted from the MPEG packet are forwarded to the playback packetizer 530.

Figure 6:
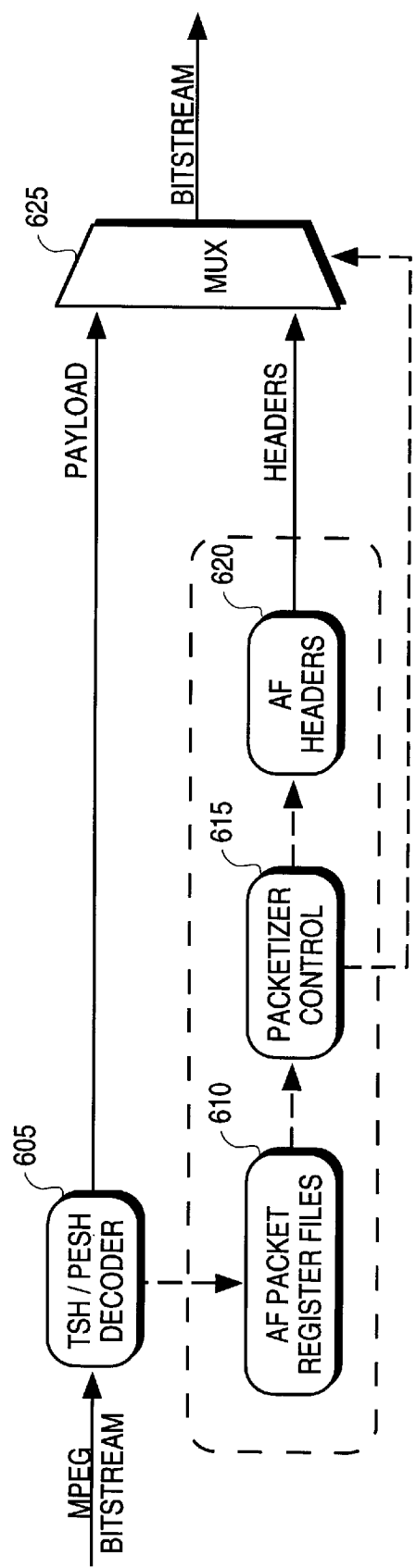
FIG. 6 is a simplified diagram of the recording packetizer.

A simplified block diagram of the playback packetizer is illustrated by FIG. 6. The MPEG bit stream is forwarded to TSH/PESH decoder 605 which decodes the transport packet header (TSH) and PES header and determines whether the video is copy protected. The DTV packet register files 610 contain the headers extracted from the MPEG packet received upon playback by the digital cassette playback device such as the SCID, picture start code, audio PES header, PCR, PTS, DTS. The packetizer control 615 forms the headers 620 and controls the multiplexing mechanism 625 to generate the output packet bit stream.

Figure 7:
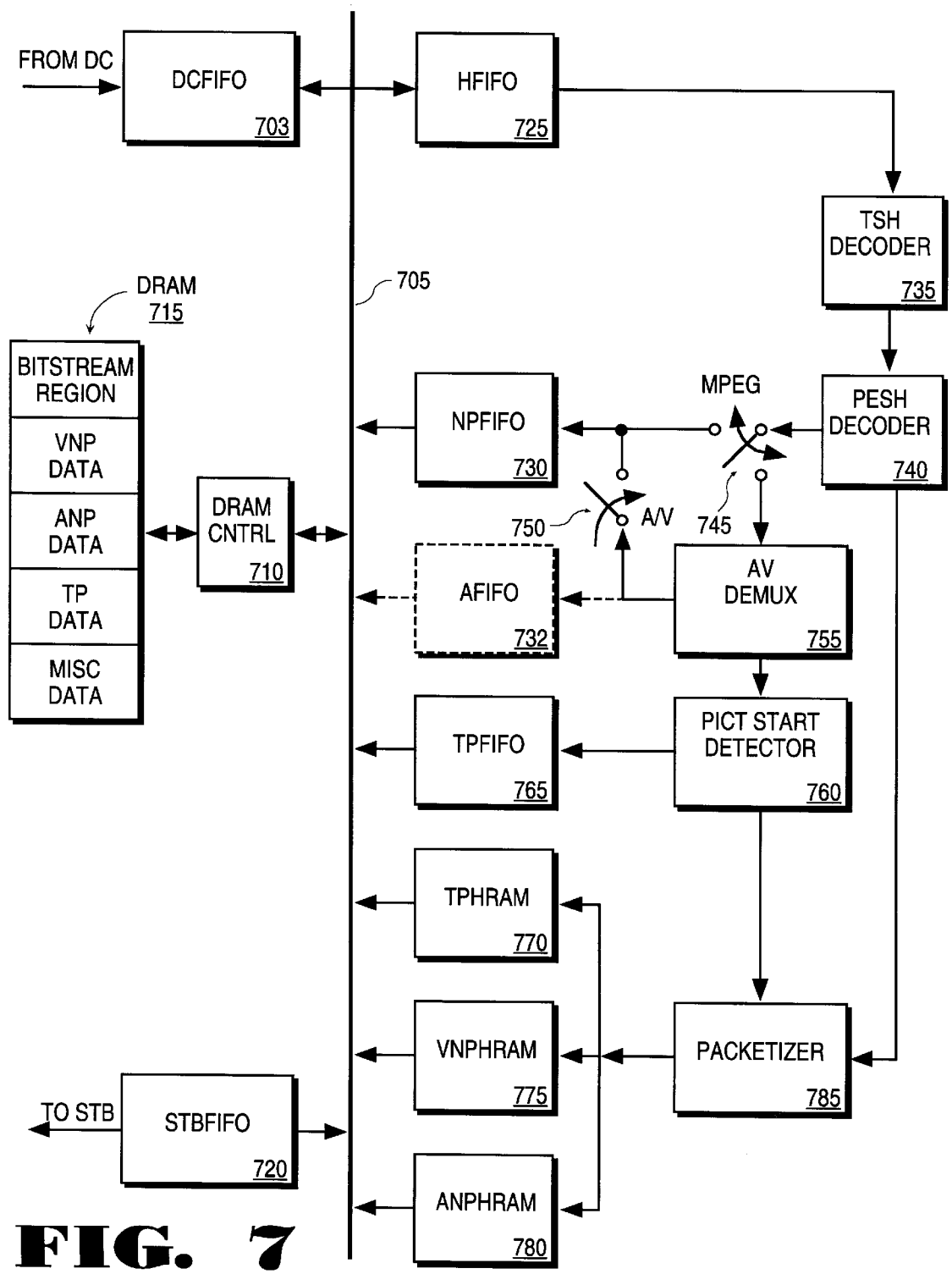
FIG. 7 is a timing diagram illustrating the operation of the recording packetizer.

FIG. 7 is illustrative of an exemplary system structure for playback of digital data in accordance with the teachings of the present invention. The commonalty of circuitry is illustrative by comparison of FIGS. 4 and 7. In some instances, circuitry is used in a different manner to save on hardware while achieving the desired end result. For example, as noted below, the TPFIFO is use during the playback process for video data and NPFIFO is used for audio data. By using common circuitry, a cost effective, but efficient, device for the recording and playback of multiple format data is provided. Referring to FIG. 7, data is received from the digital recording device to DCFIFO 703 and output, under control of DRAM controller 710, to the bitstream region of the DRAM 715. The data is then forwarded to HFIFO 725.

Data is communicated asynchronously along HBUS 705 to TSH decoder 735 and PESH decoder 740. The output of PESH decoder 740 is forwarded to switch 745 and alternate format (AF) packetizer 785 for further processing of the data. In particular, if the data is to be output to an MPEG compatible device, the switch 745 operates to load the data into NPFIFO 730. If the device is compatible with the alternate format, the switch 745 operates to forward the data to A/V demultiplexer 755 which separates the audio data from the video data. The video data is forwarded to the picture start detector 760 which determines the beginning of the actual video data and forwards it to TPFIFO 765 and to packetizer 785. The audio data is forwarded to NPFIFO 730. Alternately, if the embodiment includes a separate audio FIFO 732, the audio data is buffered in AFIFO 732. The packetizer 785 forms the header 770, 775 and 780 compatible with the alternate format. The DRAM controller 710 reads the buffers 730, 765, 770, 775 and 780 in a sequence to generate the bitstream for subsequent output to STBFIFO 720 and the output device.

The benefits are realized when translating the packets generated in an alternate format to the MPEG format or from the MPEG format to an alternate format. For example, if an alternate format that may be shorter in length that the MPEG format. In addition header information may be located in a slightly different position in the packet. The apparatus and method of the present invention converts packets received in the alternate format to a format compatible with the MPEG format. Due to the incompatibilities, dummy data may be inserted to increase the length of the payload and therefore ensuring the proper location of the headers. In addition, the headers may be modified between formats for compatibility. During playback, this format of a packet may be converted back to its original format for compatibility with the display or other device and therefore would be transformed back to a form compatible with the original format.

Similarly, for data originating in the MPEG format, the apparatus and method of the present invention enables the conversion to the alternate format by generation of the necessary header information and insertion of dummy information to increase the lengths of where needed of packets.

The invention has been described in conjunction with the preferred embodiment. It is evident that numerous alternatives, modifications, variations and uses will be apparent to those skilled in the art in light of the foregoing description.

What is claimed is:

1. A video recording apparatus comprising:
   a first input for receiving a first video stream in a first format;
   a display for outputting the first video stream to a display system compatible with the first format;
   a recording device, said recording device recording video streams in a predefined compressed video format; and
   a translator selectively coupled between the first input and the recording device, said translator including a process when the first video stream is to be recorded for extracting the video information from the first video stream, generating header information that is compatible with the predefined compressed video format and combining the header information generated with the extracted video information to generate a modified first video stream in the predefined compressed video format for output to the recording device.

2. The apparatus as set forth in claim 1, further comprising a descrambler coupled between the first input and the display for descrambling first video stream, said descrambled first video stream input to the translator process when the first video stream is to be recorded.

3. The apparatus as set forth in claim 1, wherein the first input receives video streams via a satellite broadcast.

4. The apparatus as set forth in claim 1, further comprising:
   a second input for receiving a second video stream in the predefined compressed video format; and
   a switch coupled to the output of the second input and the translator, said switch for switching as input to the recording device the second video stream or the modified first video stream.

5. The apparatus as set forth in claim 1, wherein the translator is bidirectional such that a recorded video stream played back by the recording device is translated by the translator to the first format for output to the display system.

6. A system for recording in a predefined compressed format an input data stream composed of packets comprising:
   a packet decode for determining whether the input data packet is in the predefined compressed format;
   a first decoder that extracts audio/video data from the packet and selectively forwards header and audio/video information to a switch and normal play video data to a multiplexer if the input data stream is in the predefined compressed format, said first decoder further issuing a first audio control signal to the switch if the audio/video information comprises audio data;

a second decoder that extracts audio/video data from the input data packet and selectively forwards audio/video information and header information to the switch and normal play video data to the multiplexor if the input data stream is in an alternate format, said second decoder further issuing a second audio control signal to the switch if the audio/video information comprises audio data;

said switch selectively forwarding the audio/video information to audio recording circuitry to generate audio normal play data based on the first audio control signal and the second audio control signal, said switch alternately forwarding the header and audio/video information to a packetizer;

said packetizer generating header data that is compatible with the predefined compressed format, said packetizer further generating dummy data to be included in an output packet if the input data packet is shorter in length than the output packet; and said multiplexor coupled to receive header data, dummy data, video normal play data and audio normal play data as input, said inputs multiplexed as output to form the output packet.

7. The system as set forth in claim 6, further comprising a trick play circuit that is coupled between the switch and the packetizer and is configured to receive the audio/video information and generate a trick play header that is input to the packetizer and trick play data that is input to the multiplexor, such that trick play data packets are selectively formed as output packets.

8. The system as set forth in claim 6, wherein said packetizer forwards the header information received as the header data output to the multiplexor when the input data packet is in the predefined compressed format.

9. A system for playing back an input data stream in an alternate format, said input data stream being composed of packets in a predefined compressed format, said system comprising:

an audio/video decoder for decoding the header and issuing a first control signal indicative of whether the packet comprises audio data or video data;

a switch coupled to receive the first control signal, said switch selectively outputting the input packet to an audio alignment circuit or a video alignment circuit;

said audio alignment circuit generating a header compatible with and aligning the audio data in a manner compatible with the alternate format and outputting the header and data to a playback packetizer;

said video alignment circuit generating a picture start code and aligning the video data in a manner compatible with the alternate format and outputting the header and data to the playback packetizer;

said playback packetizer generating an output data stream of packets compatible with the alternate format.

10. The system as set forth in claim 9, further comprising:

a second decoder for decoding a header of an input packet and issuing a second control signal indicative of the format of the input packet; and a second switch coupled to receive the input packet and selectively coupled to the first switch and an output, said second switch configured to couple the input to the output when the format of the input packet is in the alternate format.

11. The system as set forth in claim 10, wherein the second decoder further receives as input an indication of the format compatible with the playback device, said second decoder issuing a second control signal based upon the format of the input packet and the format compatible with the playback device.

12. A method for recording video comprising the steps of:

receiving a first video stream in a first format comprising a plurality of packets;

for each packet;
    extracting the video information from the first video stream;
    generating header information that is compatible with a predefined compressed video format,
    combining the header information generated with the extracted video information to generate a modified first video stream in the predefined compressed video format, and
    recording the modified first video stream in the predefined compressed video format.

13. The method as set forth in claim 12, further comprising the step of descrambling first video stream, said descrambled first video stream, said steps of extracting, generating, combining and recording performed with respect to the descrambled first video stream.

14. The method as set forth in claim 12, further comprising the step of generating trick play data for recording in the predefined compressed video format.

15. The method as set forth in claim 12, further comprising the step of generating dummy data if the format of a packet in the first video stream is shorter than a packet size of the predefined compressed video format.

16. A method for playing back video in an alternate format comprising the steps of:

receiving a playback data stream comprising a plurality of packets in a predefined compressed format;

for each packet;
    decoding the header to determine whether the packet comprises audio data or video data,
    if the packet comprises audio data, generating a header compatible with and aligning the audio data in a manner compatible with the alternate format, and
    if the packet comprises video data, generating a picture start code and aligning the video data in a manner compatible with the alternate format; and generating an output data stream of packets compatible with the alternate format.

17. A system coupled to a recording/playback device capable of recording or playing back audio and video packets in a first predetermined format, said system selectively translating audio and video packets in a format to be recorded to the first predetermined format, said system selectively translating audio and video packets to be played back from the first predetermined format to an alternate format, said system comprising:

a first input/output coupled to a first media capable of inputting and outputting said audio and video packets in the alternate format;

a second input/output coupled to the recording/playback device operable on said audio and video packets in the first predetermined format;

a bus coupled to the first input/output and second input/output;

a memory coupled to the bus;

a plurality of buffers coupled to the bus, said buffers configured to store portions of a packet in either the first predetermined format or the alternate format;

logic coupled to the buffers, said logic configured to decode a received packet and allocate each portion of the packet that corresponds to known portions of a packet in the first predetermined format to a corresponding buffer;

a bus controller coupled to the bus and controlling movement of packet between elements coupled to the bus, said bus controller configured to;

upon receipt of a packet from the first input/output in the memory, forwarding the packet across the bus to a first buffer of a plurality of buffers, said first buffer coupled to the logic, said logic receiving the packet from the first buffer and decoding portions of the packet and outputting portions to corresponding buffers of the plurality of buffers, said controller further moving the portions in the buffers to the memory to form a packet in the first predetermined format and communicating the packet in the first predetermined format from the memory to the second input/output, and upon receipt of a packet from the second input/output in the memory, forwarding the packet across the bus to the first buffer, said logic receiving the packet from the first buffer and decoding portions of the packet and outputting portions to the corresponding buffers, said controller further moving the portions in the buffers to the memory to form a packet in the alternate format and communicating the packet in the alternate format to the first input/output.

* * * * *